Patented Jan. 3, 1933

1,892,890

UNITED STATES PATENT OFFICE

EDWARD T. HOWELL AND IVAN GUBELMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

SUBSTITUTION PRODUCTS OF AMINO BENZOYL ORTHO BENZOIC ACID AND PROCESS OF PREPARING THE SAME

No Drawing. Application filed July 2, 1928. Serial No. 290,032.

This invention relates to the N-substituted products of p'-amino benzoyl ortho benzoic acid and to a process of preparing the same. These new products include the N-substituted products of p'-amino benzoyl ortho benzoic acid wherein one or both of the hydrogen atoms in the amino group has been replaced by such acidyl groups as acetyl, toluene sulfonyl, benzoyl, phthaloyl, or by benzylidene groups and the like.

It is an object of this invention to provide a method of preparing the N-substituted products of p'-amino benzoyl ortho benzoic acid and to make these bodies technically available, because they are valuable products of themselves and more particularly because of their value as starting materials in the preparation of other products.

Other and further important objects of this invention will become apparent from the following description and appended claims.

The preparation of p'-amino benzoyl ortho benzoic acid is described in U. S. Patent No. 1,654,290.

We have now found that one or both of the hydrogen atoms in the amino group of this compound may be substituted by certain groups to form a N-substituted p'-amino benzoyl ortho benzoic acid which may be readily hydrolyzed back to p'-amino benzoyl ortho benzoic acid. We have further found that these N-substituted p'-amino benzoyl ortho benzoic acids may be condensed to the corresponding N-substituted beta amino anthraquinone bodies, or, because of the ease with which the bodies are hydrolyzed, may be condensed to beta amino anthraquinone bodies.

The condensation method employed to effect closing of the ring to the anthraquinone bodies may be any one of the known methods which have been found applicable in similar reactions, as for example, by the use of a concentrated sulfuric acid at an elevated temperature.

It has been found that in the preparation of the beta amino anthraquinone bodies, the use of these substitution products possesses certain advantages over the use of the parent substance, p'-amino benzoyl ortho benzoic acid, in that the substituted group acts to protect the amino group or the remainder of the molecule during the condensation reaction.

We are aware of the fact that p'-dimethyl amino benzoyl ortho benzoic acid has been prepared and condensed in a similar manner to produce the corresponding beta dimethyl amino anthraquinone, but we do not include this body as a part of our present invention inasmuch as it is neither formed in an analogous manner to the present N-substituted products nor is it hydrolyzable under the same conditions as imposed by our process. Among the substituted products included in our invention are those formed by the use of acidyl substitution groups, such as acetyl, benzoyl, phthaloyl, urea, toluene sulfonyl, benzene sulfonyl and the like, and such groups as benzylidene. In other words the substituted groups of our invention are members typified by the following residues:

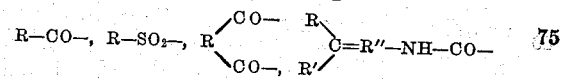

and the like in which R is an organic radical, R' an organic radical or hydrogen and R" another benzoyl-ortho-benzoic acid residue, and all the members of the series having the property of being readily hydrolyzed.

In general, known methods for preparing analogous derivatives of other amines may be employed by those skilled in the art to prepare the new derivatives forming the subject of our present invention. Similarly, the parent substance, p'-amino benzoyl ortho benzoic acid and the corresponding N-substituted products may be condensed to beta amino anthraquinone and N-substituted beta amino anthraquinone derivatives by employing known methods applicable to the condensation of ortho amino benzoyl benzoic acids or substituted amino benzoyl ortho benzoic acids, as for example by heating in a concentrated sulphuric acid.

Without limiting our procedure to any specific method, the following examples in which parts by weight are given serve to illustrate the preferred embodiments of our invention.

Example 1

Acetyl p'-amino benzoyl ortho benzoic acid.

To 50 parts of glacial acetic acid are added 25 parts of p'-amino benzoyl ortho benzoic acid, melting point 200° C. This mixture is heated to the boiling point and there is then added 12.5 parts of acetic anhydride. Continue boiling for a short time under a reflux condenser. Cool to room temperature and filter off the crystals. The crystals are washed with a small amount of acetic acid and then with a little water. The melting point of the dried crystals was found to be 277° C. The product is a white to cream colored crystalline solid, difficultly soluble in glacial acetic acid and nitrobenzene but more easily soluble in alcohol and acetone. Upon heating with concentrated sulfuric acid, ring closing is effected to produce beta amino anthraquinone.

Example 2 p'-phthaloylamino benzoyl ortho benzoic acid.

10 parts of p'-amino benzoyl ortho benzoic acid and 6.2 parts of phthalic anhydride are added to 32 parts of nitrobenzene and heated to 180 to 200° C. Heat for about one hour at the above temperature, then cool. Filter off the crystals and wash them with a small amount of nitrobenzene and then a small amount of benzol. Dry the crystals. The product may be recrystallized from nitrobenzene to a melting point of 294° C. The p'-phthaloylamino benzoyl ortho benzoic acid is a white crystalline substance somewhat soluble in hot nitrobenzene, glacial acetic acid and acetone, but difficultly soluble in most of the other general organic solvents. Upon heating with concentrated sulfuric acid, ring closing is effected to beta amino anthraquinone. Phthalic acid may be recovered from the filtrate.

Example 3 p'-benzylidene amino ortho benzoyl benzoic acid.

10 parts of p'-amino benzoyl ortho benzoic acid are added to 30 parts of benzaldehyde and the mass is heated to the boiling point under a short reflux condenser so that the water formed can be removed from the reaction mass. The mass is refluxed gently until no more water is given off, usually requiring about one hour. The reaction mixture is then cooled and the crystals which form on cooling filtered off and washed with a small amount of toluene. The melting point of the product thus obtained is 215 to 219° C. Upon recrystallizing the above product from solvents, the melting point could not be raised. During the recrystallization the material is subject to some decomposition. Upon treating this body with hot concentrated sulphuric acid, ring closing is effected. By subsequent dilution and boiling to remove the hydrolyzed benzaldehyde, beta amino anthraquinone can be recovered from the dilution mass.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing N-substituted p'-amino-benzoyl-ortho-benzoic acid, which comprises reacting upon p'-amino-benzoyl-ortho-benzoic acid with an acidylating agent which introduces readily hydrolyzable protective groups into the N-atom to form the corresponding N-substituted p'-amino-benzoyl-ortho-benzoic acid having the property of being readily hydrolized back to p'-amino-benzoyl-ortho-benzoic acid.

2. The process of preparing N-substituted p'-amino-benzoyl-ortho-benzoic acid, which comprises reacting upon p'-amino-benzoyl-ortho-benzoic acid with an acidylating compound containing a group which is a member of the group consisting of R—CO—, R—SO$_2$, and

in which R is an organic radical to form derivatives which may be readily hydrolized back to p'-amino-benzoyl-ortho-benzoic acid.

3. The process of preparing p'-acetyl-amino-benzoyl-ortho-benzoic acid, which comprises reacting upon p'-amino-benzoyl-ortho-benzoic acid with acetic acid and acetic anhydride.

4. The process of preparing p'-phthaloyl-amino-benzoyl-ortho-benzoic acid, which comprises reacting upon p'-amino-benzoyl-ortho-benzoic acid with phthalic anhydride.

5. The process of preparing p'-benzylidine-amino-ortho-benzoyl-benzoic acid, which comprises reacting upon p'-amino-benzoyl-ortho-benzoic acid with benzaldehyde.

6. As new articles of manufacture, N-substituted p'-amino-benzoyl-ortho-benzoic acid which is the reaction product of p'-amino-benzoyl-ortho-benzoic acid and an acidylating agent which introduces readily hydrolyzable protective groups into the N-atom.

7. As a new article of manufacture, an N-substituted p'-amino-benzoyl-ortho-benzoic acid in which the amino group is substituted with an acidylating compound containing a group which is a member of the group consisting of R—CO—, R—SO$_2$— and

in which R is an organic radical.

8. As a new article of manufacture, p'-acetyl-amino-benzoyl-ortho-benzoic acid.

9. As a new article of manufacture, p'-phthaloyl-animo-benzoyl-ortho-benzoic acid.

10. As a new article of manufacture, p'-benzylidine-amino-ortho-benzoyl-benzoic acid.

In testimony whereof we have hereunto subscribed our names at Carrollville, Milwaukee County, Wisconsin.

EDWARD T. HOWELL.
IVAN GUBELMANN.